United States Patent [19]

Wood

[11] Patent Number: 5,189,644
[45] Date of Patent: Feb. 23, 1993

[54] REMOVAL OF AMPLITUDE ALIASING EFFECT FROM SEISMIC DATA

[76] Inventor: Lawrence C. Wood, 15606 Grovespring Dr., Houston, Tex. 77068

[21] Appl. No.: 830,631

[22] Filed: Feb. 4, 1992

[51] Int. Cl.$^5$ .............................................. G01V 1/28
[52] U.S. Cl. ........................................ 367/38; 367/65
[58] Field of Search .................. 367/38, 47, 65, 21, 367/24, 63; 364/421

[56] References Cited

U.S. PATENT DOCUMENTS

| | | | |
|---|---|---|---|
| 3,581,274 | 5/1971 | Ruehle | 340/15.5 |
| 4,380,059 | 4/1983 | Ruehle | 367/46 |
| 4,535,417 | 8/1985 | Peacock | 364/724 |
| 4,594,693 | 6/1986 | Pann et al. | 367/43 |
| 4,628,492 | 12/1986 | Wirney | 367/63 |
| 4,809,238 | 2/1989 | Bishop et al. | 367/46 |
| 4,852,068 | 7/1989 | Track | 367/57 |
| 4,860,265 | 8/1989 | Laster et al. | 367/73 |
| 4,885,722 | 12/1989 | Leland | 367/25 |
| 4,907,205 | 3/1990 | Yanchak | 367/52 |
| 4,964,102 | 10/1990 | Kelly et al. | 367/47 |

OTHER PUBLICATIONS

Taner, M. T. et al., "The Computation and Interpretation of Seismic Attributes by Complex Trace Analysis", 1977, pp. 3–29.
Ongkiehong, L. et al., "Towards the Universal Seismic Acquisition Technique", *First Break*, vol. 6, No. 2, Feb. 1988, pp. 46–62.
Ongkiehong, L. et al., "Dynamic Range of the Seismic System", *First Break*, vol. 5, No. 12, Dec. 1987, pp. 435–439.
Taner, M. T. et al., "Application of Amplitude, Frequency, and Other Attributes to Stratigraphic and Hydrocarbon Determination", *Seismic Stratigraphy-Applications to Hydrocarbon Exploration*, 1977, pp. 301–327.
Benoliel et al., "Frequency Wavenumber Approach of the $\tau$-p Transform: Some Applications in Seismic Data Processings," *Geophysical Prospecting*, vol. 35, #5, 1987.

*Primary Examiner*—Ian J. Lobo
*Attorney, Agent, or Firm*—Pravel, Gambrell, Hewitt, Kimball & Krieger

[57] ABSTRACT

Balancing of signal amplitudes in recorded seismic data prior to its transformation from its original domain (such as offset-time, or X-T) to a different domain (such as frequency-wave number, or F-K) has been found to cause unwanted repetitive pattern dispersion in the data. This unwanted effect is removed by determining a corrective factor, the ratio of amplitude of the seismic data to its trace envelope, prior to transformation. The data is then transformed into the different domain where meaningful reflection content is enhanced, such as by two-dimensional filtering. The data is then inverse transformed to the original domain. An inverse corrective factor is then applied, restoring the amplitude of the reflection signal component of the data.

15 Claims, 8 Drawing Sheets

REMOVAL OF AMPLITUDE ALIASING EFFECT FROM SEISMIC DATA

BACKGROUND OF THE INVENTION

1. Field of the Invention

The present invention relates to processing of seismic data representative of subsurface features in the earth during geophysical exploration.

2. Description of the Prior Art

Seismic recordings acquired in oil and gas exploration are sampled in both space (X) and time (T). This is conventionally referred to as the offset-time or X-T domain. The offset-time ensemble can be common source, common receiver, common midpoint or common offset gathers. Seismic signal energy in the seismic recordings is composed of both a reflection signal component and unwanted noise.

In the X-T domain, noise and reflection signal commonly overlap, with noise masking or interfering with the reflection signal component of interest concerning subsurface features. It has been common practice to transform the recordings from the offset-time, or X-T, domain to another domain for noise attenuation and reflection signal enhancement. The frequency-wavenumber (or F-K) domain and the time-slowness (or TAU-P) domain are ones into which seismic recordings were often transformed from the time-offset domain for these purposes. Appropriate filters have been designed for operation in these domains to attenuate noise and enhance reflection signals.

Prior to transformation from the original or time-offset domain to another domain, it has been conventional to employ amplitude balancing of the signal energy. The signal amplitudes, as has been set forth above, have two components. The first is the meaningful reflection information component of interest as to subsurface structure. The second amplitude component is composed of unwanted noise or amplitude variations which may arise due to a number of factors or effects. Examples include non-uniform array weighting and variations either in geophone coupling or in surface layer material. When amplitude balancing was done before data transformation to another domain, the unwanted amplitude variations were transformed along with the reflection signal of interest. This caused repetitive pattern dispersion in the transformed data, often masking or hiding meaningful information present in the data.

SUMMARY OF INVENTION

Briefly, the present invention provides a new and improved method of processing seismic data to remove the effect of amplitude aliasing from displays of the seismic data. As used in the present invention, amplitude aliasing is intended to mean unwanted repetitive pattern dispersions in the transformed seismic data. These unwanted pattern dispersions have been found to be introduced when signal energy amplitude balancing is done before data transformation from one domain to another.

Field records of seismic data are obtained at a number of seismic receivers in an area of interest. The field records may be from a two-dimensional seismic survey along a line of profile, or a three-dimensional survey over a surface area of interest. The field records or seismic recordings contain the amplitude of seismic signal energy. The seismic data are then assembled into common geometry gathers. The common geometry gathers may be any of several types of seismic gathers: common source gathers; common receiver gathers; common midpoint (also known as CDP) gathers or common offset gathers, for example. Once so assembled, a gain control operator is applied to the data to balance signal amplitudes in the data.

After the gain control operator is applied, the assembled data is then transformed to a different domain, such as from the time-offset domain to the frequency-wave number domain. The reflection signal content of the seismic energy in the seismic data is then enhanced. The enhanced signal content data is then inverse transformed to the original domain from the different domain. An inverse of the gain control operator originally applied is then applied to the inverse transformed data. The foregoing process effectively removes the amplitude aliasing or unwanted repetitive pattern dispersions in the transformed seismic data. Displays of the seismic data are then formed. In the displays of seismic data so formed, the undesirable effects of amplitude aliasing are not present.

DESCRIPTION OF THE PREFERRED EMBODIMENT

Figure 1:
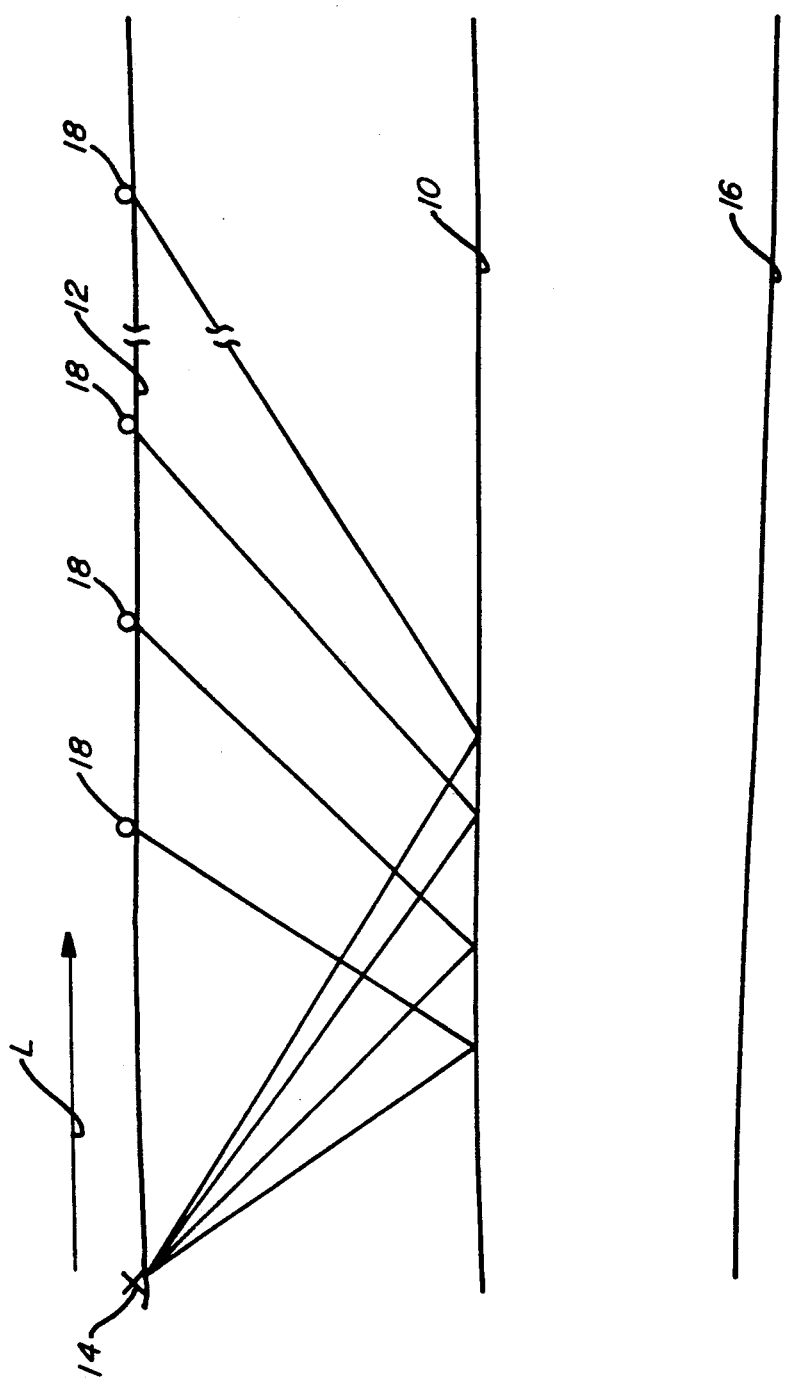
FIG. 1 is a schematic diagram of a seismic survey in which field records of seismic data are obtained at a number of seismic receivers in an area of interest.

In the drawings, a schematic diagram of a seismic survey in offset-time (X-T) space along a seismic line of profile L of subsurface formations, such as one indicated schematically at 10 beneath the earth surface 12 is shown. As is conventional, seismic energy is imparted as energy waves into the earth from a seismic source 14, from which the seismic energy waves travel through subsurface formations in an area of interest. As the seismic energy waves travel through the earth and encounter formations such as the ones indicated schematically at 10 and 16, a portion of their signal energy is reflected to travel upwardly to a number of sensors or receivers 18, where the incoming seismic signal energy is sensed and digitally recorded for subsequent processing. The seismic signal energy in the seismic recordings is composed of both a reflection signal component and unwanted noise.

It should be understood that the seismic survey depicted schematically in FIG. 1 is a simplified one presented for illustrative purposes. Actual surveys typically include a considerably larger number of sensors or receivers. Further, the survey may be a land seismic survey using geophones or a marine seismic survey using hydrophones to explore subsurface formations beneath a body of water. The survey may also be a three-dimensional survey over a surface area of interest rather than a two-dimensional survey along the line of profile L as shown.

In geophysical exploration, seismic data which is most typically digitally recorded in offset-time (X-T) space is commonly transformed to other domains such as frequency-wavenumber (F-K) or time-slowness (TAU-P) for signal enhancement. Prior to this transformation of the seismic data from one domain into another, it has been conventional practice to perform amplitude balancing of the seismic signal energy. When amplitude balancing was done, it has caused repetitive pattern dispersion in the transformed data, often masking or hiding meaningful information present in the seismic data. With the present invention, the cause for this unwanted repetitive pattern dispersion has been identified and its removal accomplished. This unwanted repetitive pattern dispersion recognized according to the present invention is termed amplitude aliasing. It has been found to be caused by amplitude balancing of unwanted noise amplitude variations in the seismic signal energy. The phenomenon of amplitude aliasing has been found to place restrictions upon the transformation and successful reflection signal processing of seismic data.

Aliasing has both kinematic and amplitude manifestations. The restrictions and requirements relating to the kinematic manifestation of apparent surface velocities and Nyquist limits are well established. Kinematic aliasing is well known. For example, an article, "Towards the Universal Seismic Acquisition Technique" by Ongkiehong and Askin, (First Breaks, Vol. 6, No. 2, Feb., 1988) reviews the subject. The restrictions and requirements relating to the amplitude manifestations due to lack of proper amplitude gain control and genuine geological hydrocarbon indicating functions, however, have previously gone virtually unrecognized.

The present invention pertains to solving the problem of the restrictions and requirements relating to amplitude aliasing manifestations. Further, the present invention solves the amplitude aliasing phenomena in a manner that permits the restoration of the amplitude variations to the processed seismic data signals so that information regarding genuine geological hydrocarbon-indicating features, e.g., "bright spots," is not lost.

Aliasing is inherent to sampled data. Seismic recordings acquired in oil and gas exploration are sampled in both space (X) and time (T). Time samples are acquired at uniform increments $\Delta t$ with an associated Nyquist folding frequency of $1/(2\Delta t)$ hertz. Spatial sampling relates in an analogous manner to group interval $\Delta x$ with an associated Nyquist spatial frequency. Where field conditions cause samples to depart from uniformity, interpolation can be included in data processing. Consequently, time and spatial sampling can be considered to be uniform with equal intervals.

Seismic waves can be analyzed in terms of plane wave components whose arrival times in X-T space are linear. Seismic reflection times are approximately hyperbolic as a function of group offset X in the following relation:

$$T_x^2 = T_o^2 + X^2/V_s^2.$$

where X is the group offset; $T_x$ is the reflection time at offset X; $T_o$ is the reflection time at zero offset; and $V_s$ is the stacking velocity.

The apparent surface velocity of a reflection at any given offset relates to the slope of the hyperbola at that offset. Apparent velocities of reflections are bounded between infinite velocity at zero offset and the stacking velocity at infinite offset. Noise components, however, range from infinite apparent velocity to about one-half the speed of sound in air.

Noise and reflection signal commonly overlap in X-T space. Many techniques seek to achieve a separation of signal and noise in other domains such as F-K or TAU-P. Appropriate filters in these domains of various designs and types are commonly and widely used to attenuate noise and enhance reflection signal. However, the amplitude aliasing caused by transformation to those domains has gone unrecognized prior to the present invention, so far as is known.

It is to be recalled that multiplication in the X-T domain with a weighting function is the same as convolving in the F-K domain with the Fourier transform of the X-T weighting function. The repetitive dispersion of both reflection signal and noise patterns throughout F-K space due to the lateral amplitude variation in X-T space constitutes the amplitude aliasing phenomenon identified by the present invention.

The cause of amplitude aliasing is the departure from uniform amplitude along signal trajectories in X-T space. Linear velocity segments in X-T space have a one-to-one mapping in F-K space provided amplitudes remain constant over the segment. Any departure from constant amplitude along an X-T trajectory has an equivalent convolution in F-K space, thereby causing repetitive pattern dispersion and is defined as amplitude aliasing according to the present invention.

Figure 3:
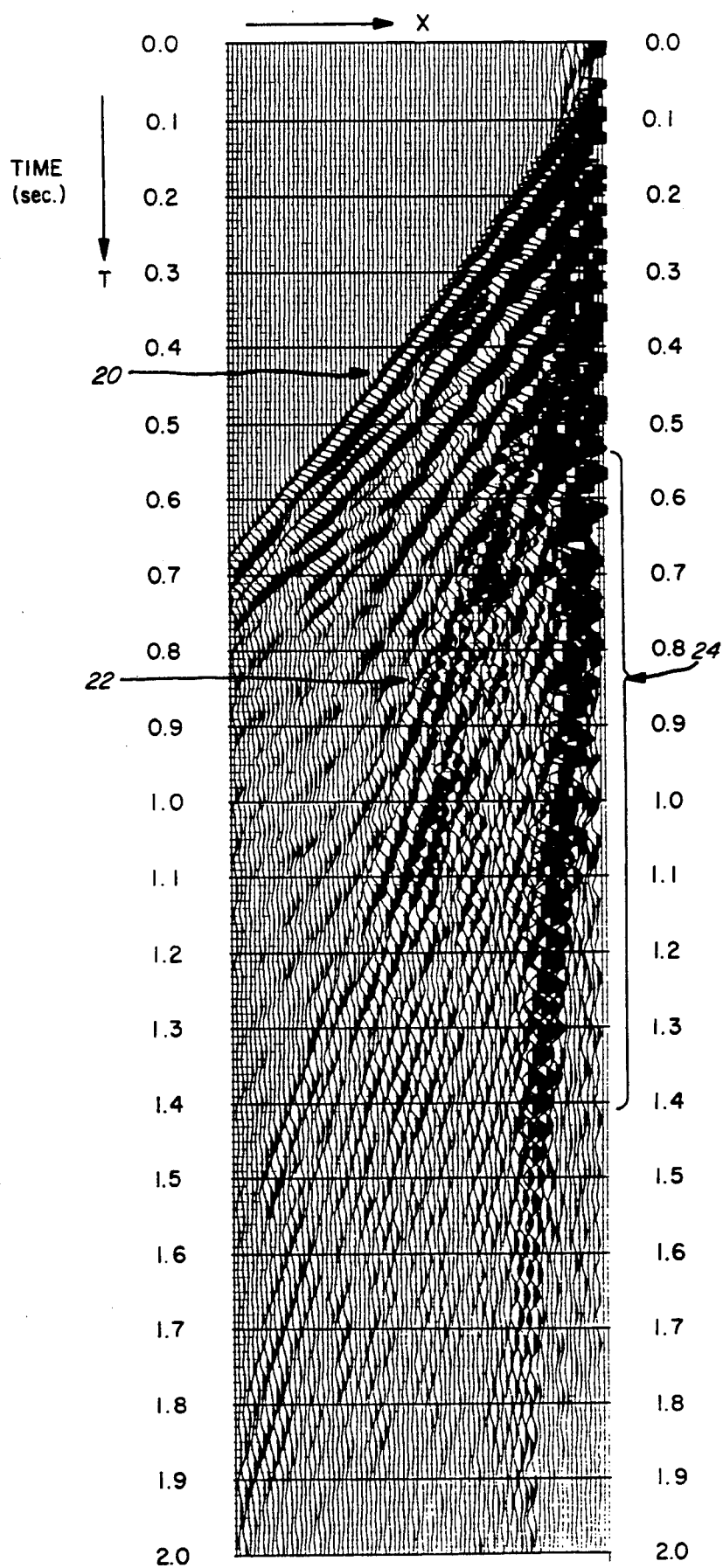
FIG. 3 is a plot or display of field records of seismic energy or seismic data as recorded along a seismic line of profile in the time-offset domain.

Turning again to the drawings, FIG. 3 is a plot or display of seismic data as originally recorded in the time-offset (T-X) domain in a seismic survey in the United States. No frequency-wave number (F-K) filter has been applied to this data before plotting. Dominant in the display are unwanted noise: refractions appearing generally in an area designated 20; ground roll occurring in an area designated 22; and the presence of what is apparently an air wave effect at 24.

Figure 4:
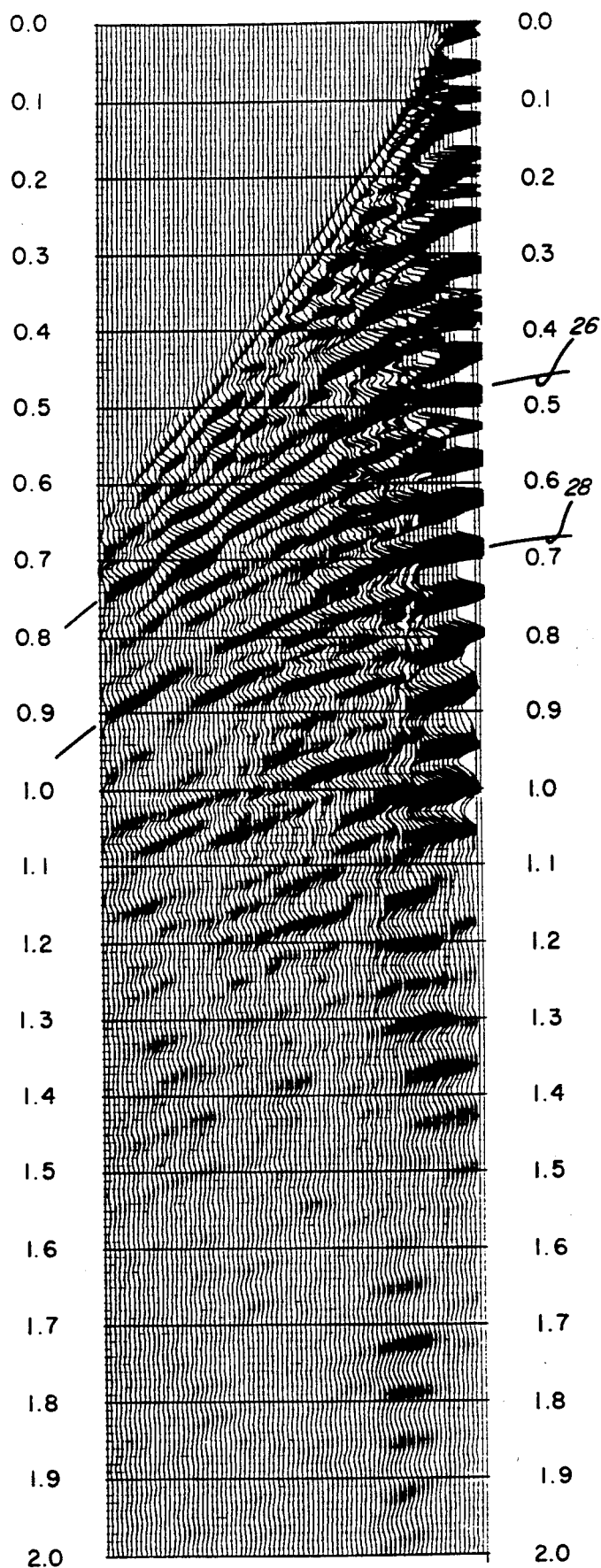
FIG. 4 is a plot or display of the seismic data of FIG. 3 after having been processed by filtering in the frequency-wave number domain.

In FIG. 4, the data displayed in FIG. 3 has been processed by a conventional frequency-wavenumber (F-K) filter. Seismic reflection signals appear by hyperbolas, such as indicated at 26 and 28. It is to be noted that the unwanted noise present in the designated areas of the data display of FIG. 3 are no longer present in FIG. 4 due to noise attenuation accomplished as a result of the F-K filtering process.

Figure 2:
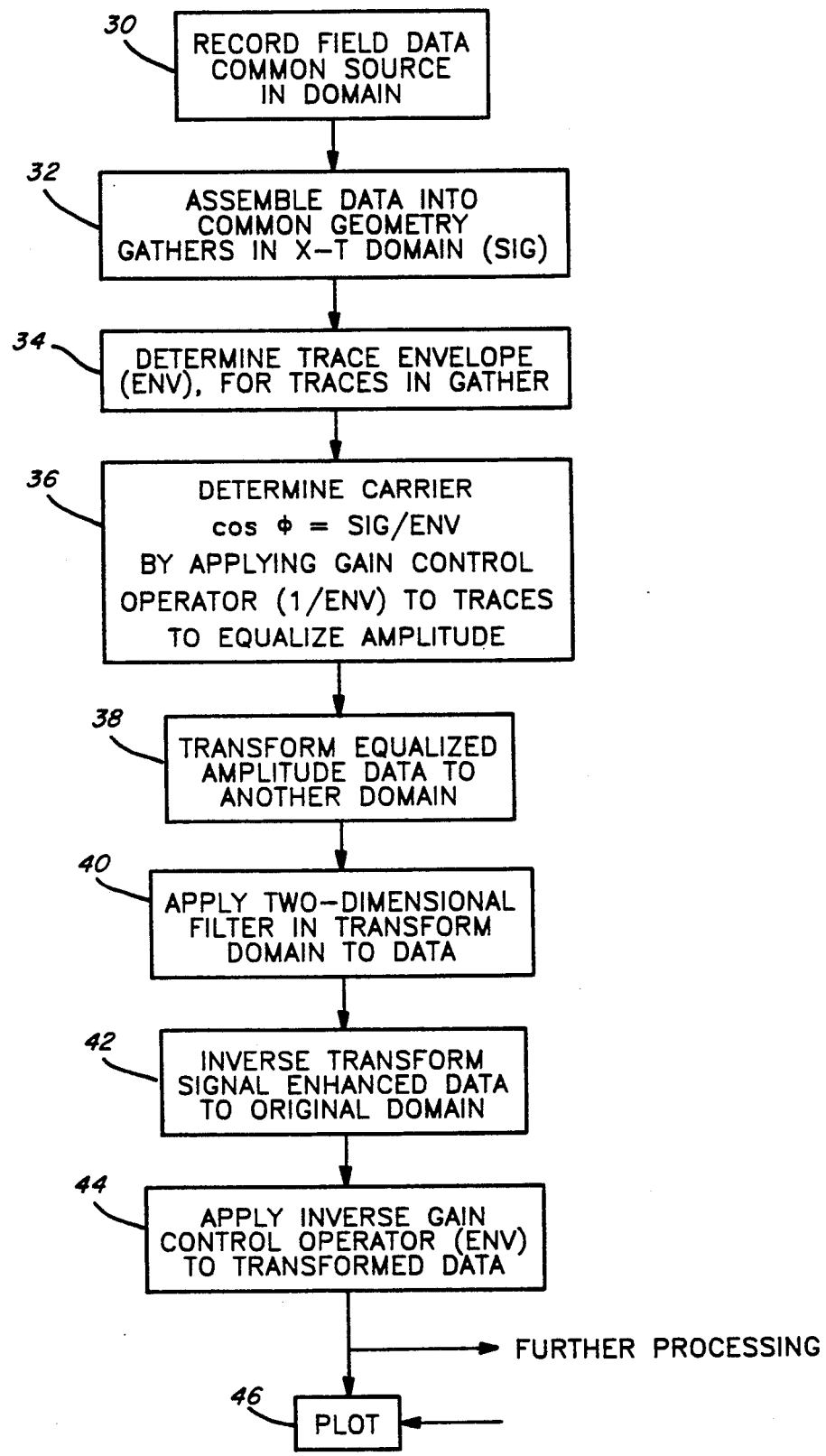
FIG. 2 is a schematic diagram of a sequence of steps of a process of transforming field records of seismic data to a form more indicative of subsurface earth features according to the present invention.

In FIG. 2, a process flow diagram of a sequence of steps according to the present invention is set forth. The steps illustrated in FIG. 2 transform field records like those of FIG. 3 or FIG. 4 into a form more indicative of subsurface earth features of interest for petroleum exploration analysis.

At step 30, field seismic data is obtained and recorded in a suitable form. It may be a two-dimensional survey such as shown schematically in FIG. 1 of common source data or some other two-, three-, or multi-dimensional seismic survey.

During step 32, the recorded data from step 30 is then assembled into a suitable common geometry gather in the time-offset or X-T domain. FIG. 3 is a plot of a number of traces of data in common geometry gather form. Most commonly used examples of common geometry gathers are: common source gathers; common receiver gathers; common midpoint (often previously termed common depth point or CDP) gather; and common offset gathers. The data of FIG. 3 are field recordings obtained in the manner of FIG. 1 and grouped in common source form. It should be understood that the foregoing are the most frequent types of common geometry gathers, although it should be understood that others may also be used.

Next is step 34, during which a trace envelope is determined for each of the traces in the common geometry gather. The determination of the envelope is performed by treating the seismic energy of a seismic trace or reading as the real component f(t) of a complex trace F(t) (having a real component f(t) and an imaginary component jf*(t)) varying as a function of time. The trace envelope e(t) is the absolute value component of the complex trace:

$$F(t) = f(t) + j f^*(t)$$

$$F(t) = e(t) \exp[\phi[t]]$$

$$f(t) = e(t) \cos[\phi[t]]$$

$$f^*(t) = e(t) \sin[\phi[t]]$$

The trace envelope e(t) of the seismic energy thus relates to the Hilbert transform of the data displayed in the traces of FIG. 3.

The Hilbert transform f*(t) operation can be expressed in the following terms:

$$f^*(\tau) = \frac{1}{\pi} P.V. \int_{-\infty}^{\infty} \frac{f(t)}{t - \tau} dt$$

where $$P.V. \int_{-\infty}^{\infty}$$

means the Cauchy principal value, $$P.V. \int_{-\infty}^{\infty} = \lim_{\epsilon \to 0} \left[ \int_{-\infty}^{t-\epsilon} + \int_{t+\epsilon}^{+\infty} \right]$$

The Hilbert transform can be used to generate the quadrature trace from the real trace or vice-versa by the convolution operation, which in digital form is $$\left. \begin{array}{l} f^*(t) = \frac{1}{\pi} \sum_{n=-\infty}^{\infty} f(t - n\Delta t) \frac{1 - e^{j\pi n}}{n} \\ = \frac{2}{\pi} \sum_{n=-\infty}^{\infty} f(t - n\Delta t) \frac{\sin^2(\pi n/2)}{n} \\ = 0, n = 0 \end{array} \right\} n \neq 0$$

where Δt is the sample interval.

Figure 5:
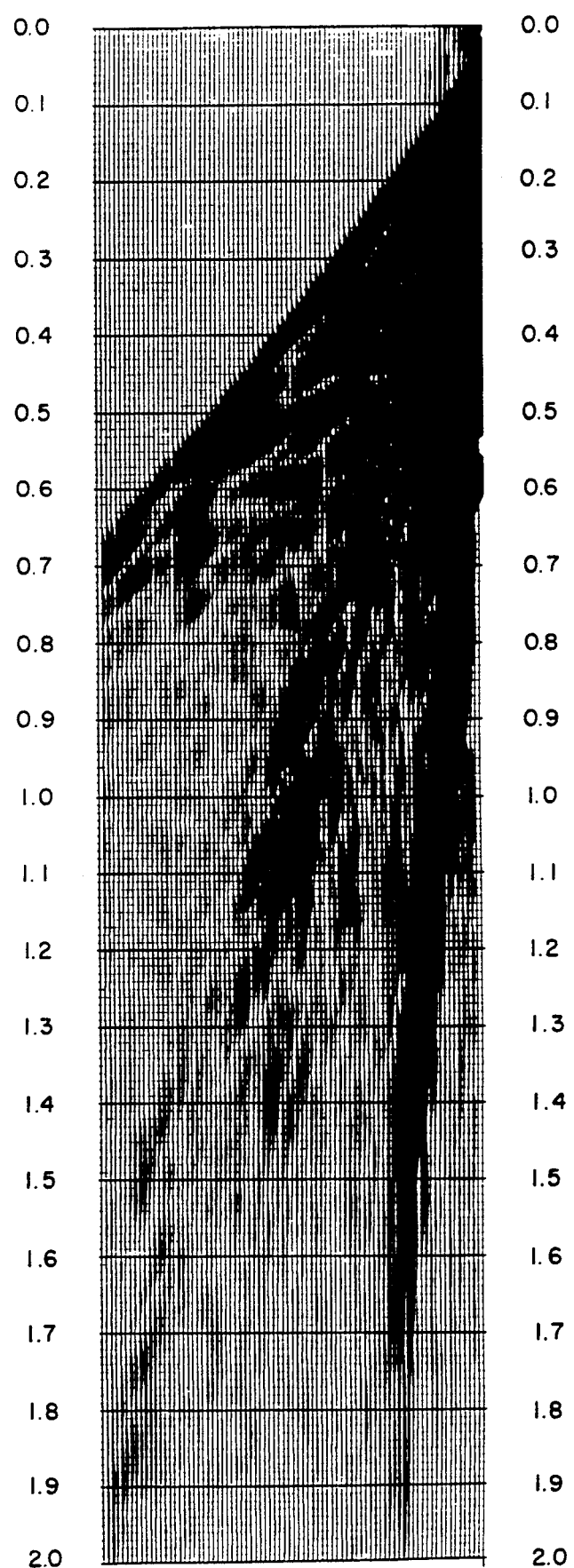
FIG. 5 is a plot or display of a trace envelope of the seismic energy in the field records of seismic data of FIG. 3.

This type of signal processing is known, as described for example in "The Computation and Interpretation of Seismic Attributes by Complex Trace Analysis", Taner et al., Sep. 1977. FIG. 5 is a plot of the trace envelopes determined according to step 34 for the recorded data displayed in FIG. 3.

Step 36 is next performed to equalize the amplitude of the seismic traces. Based on the complex trace analysis techniques set forth above, a gain control operator which is the inverse of the trace envelope determined in step 34 is first determined. This gain control operator is then applied to the traces which have been assembled into common geometry gathers during the performance of step 32 such as those traces which have been plotted in the display of FIG. 3.

Figure 6:
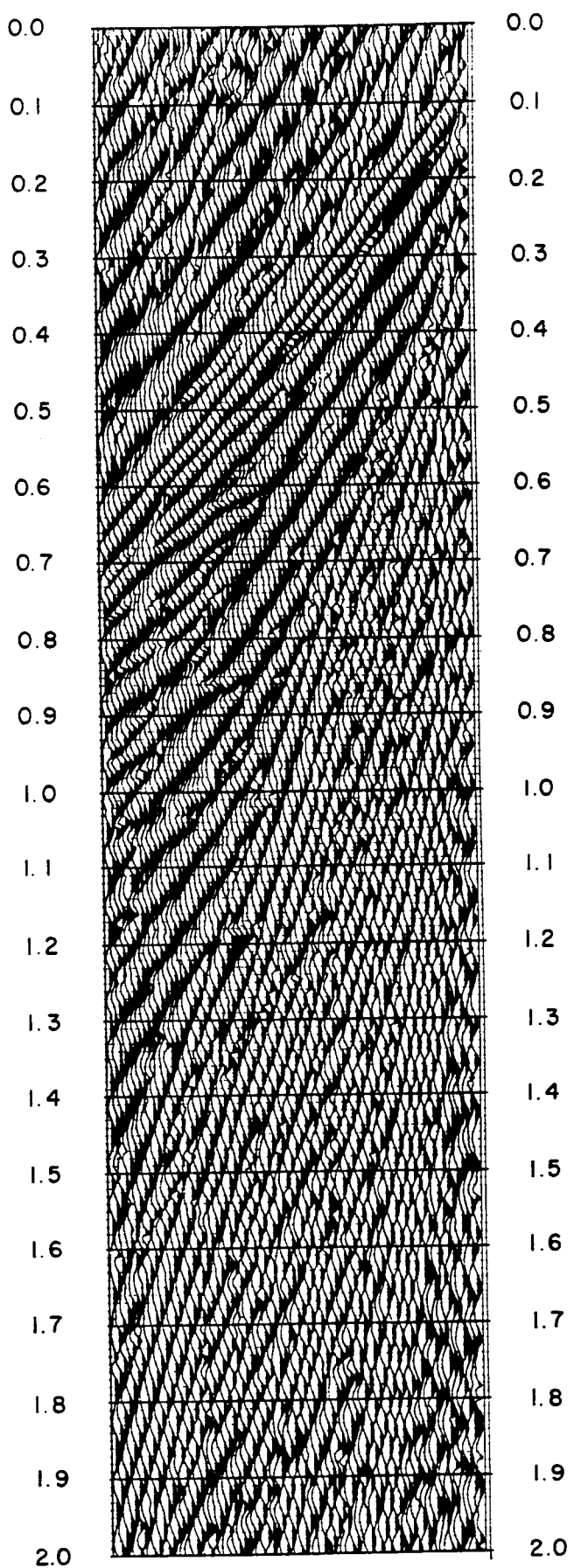
FIG. 6 is a plot or display of the ratio of the seismic energy to the trace envelope of the seismic energy in the field records of seismic data of FIG. 3.

The resultant function, termed carrier, obtained during process step 36 represents the cosine of the phase angle φ of the complex trace F(t), or the ratio of the each of the individual common geometry gather traces f(t) obtained during step 32 to its trace envelope e(t) obtained during step 34. FIG. 6 is a plot of the equalized amplitude traces or carrier function resulting from performance of step 36 on the data of FIG. 3. The portion of the display of FIG. 5 exhibiting high signal level or amplitude are areas of high noise levels in the data displayed in FIG. 3. Comparison of displays of FIGS. 3 and 5 shows that the high amplitude areas of FIG. 5 correspond to the high noise portions indicated at areas 20, 22, and 24 in FIG. 3.

The next processing occurs during step 38, as the data resulting from performance of step 36 is transformed into another processing domain. The equalized amplitude time-offset domain data (such as that of FIG. 6) is transformed to another domain, for example, into the frequency-wave number domain. Transformation into other domains such as time-slowness may also be done rather than to the frequency-wavenumber domain.

Thereafter, during step 40 a suitable multi-dimensional noise attenuation/reflection component enhancement filtering is performed. This processing enhances the reflection signal component of the equalized trace amplitude data and serves to remove unwanted noise from the data. For example, a two-dimensional F-K filtering process is applied to the data resulting from step 38, which represents the transformed, equalized amplitude data of FIG. 3.

Step 42 represents the processing done according to the present invention. During step 42, the filtered enhanced reflection component data resulting from performance of step 40 is then inverse transformed from the processing domain to which it was transformed in step 38 back to its original domain, in this embodiment the time-offset domain.

After step 42 has been performed, the next processing is performed during step 44. An inverse of the gain control operator which was determined during step 34, or in effect the trace envelope, is used during step 44. The trace envelope, which is the inverse of such gain control operator, is applied to the transformed data resulting from step 42 during the processing done as step 44.

Figure 7:
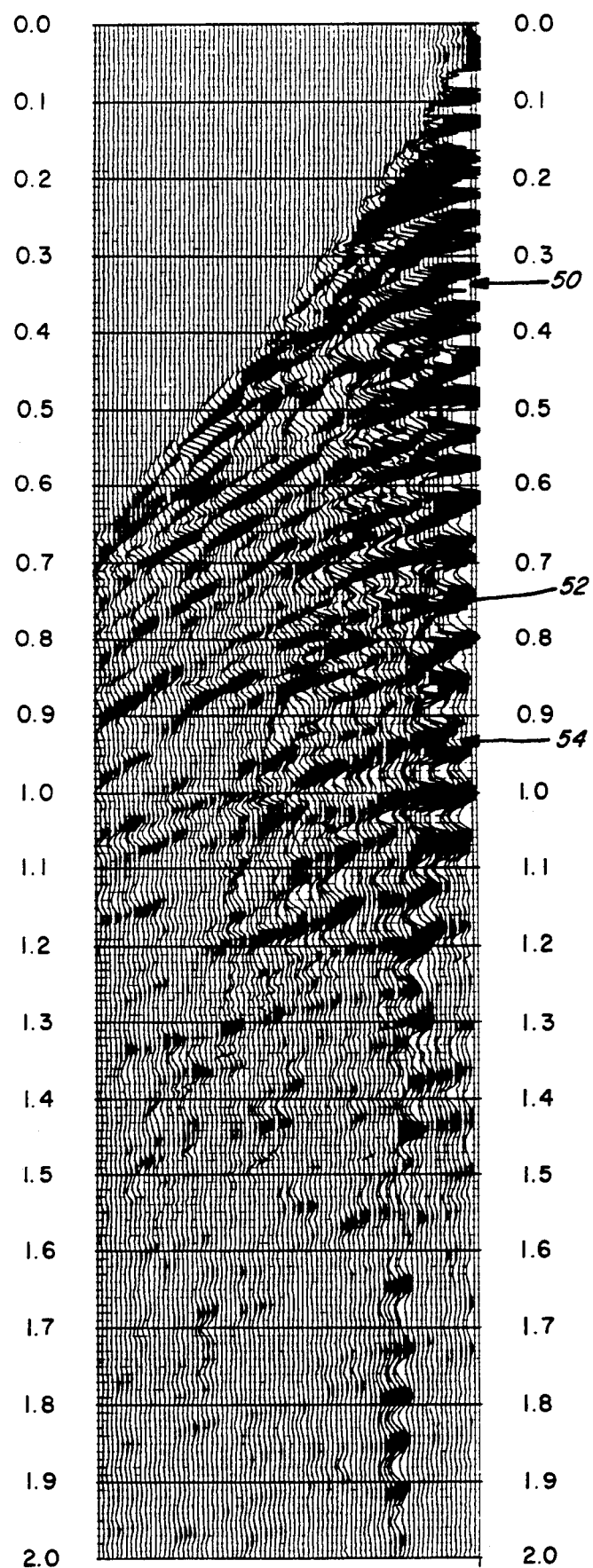
FIG. 7 is a plot or display of the data of FIG. 4 after the reflection signal component has been enhanced according to the present invention.

The resultant data from step 44 is then available for display or plotting during step 46. The resultant data from step 44 may also then be transferred to further conventional seismic data process steps, if desired. FIG. 7 is a plot formed during step 46 of the data originally displayed in the form shown in FIG. 3 after having been processed according to the present invention.

The plot area detailed at 50 at a record time of about 0.33 seconds, the plot area at 52 at a record time of 0.75 seconds and the plot area at 54 at a record time of about 0.95 seconds in FIG. 7 show considerably more highly resolved geologic detail to that of FIG. 4. The reflections detailed in these areas of the plot of FIG. 7 are thoroughly masked by amplitude aliasing in the corresponding areas of the display of FIG. 4. In fact, these details of FIG. 7 are simply not discernible in FIG. 4.

Figure 8:
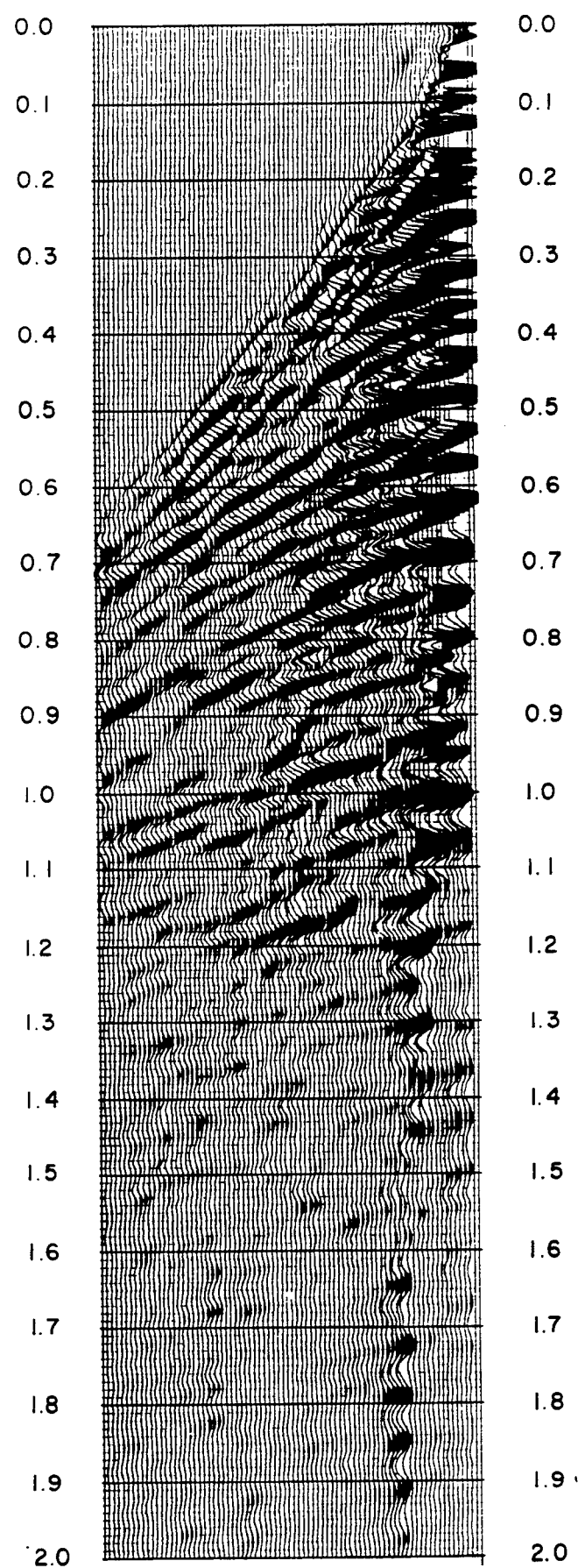
FIG. 8 is a plot or display of seismic data of FIG. 3 processed in an alternative manner according to the present invention.

FIG. 8 is a plot of the data displayed originally in FIG. 7. The data displayed in FIG. 8 has been processed according to the present invention in a slightly different manner, as detailed below. The data displayed in FIG. 8 confirm that the results of processing according to the present invention displayed in FIG. 7 are accurate.

Processing of the data displayed in FIG. 8 includes assembly of the data displayed in FIG. 3 into common source gather form, subjecting the gathered data to an automatic gain control (AGC) operator, applying a dip filter to the resultant data, then applying an inverse automatic gain control (AGC$^{-1}$) operator to the dip filtered data. These processing steps serve as an approximation alternative to more detailed steps of the present invention, the results of which are shown in FIG. 7.

The processing steps in the sequence whose results are shown in FIG. 8 serve to compensate, although the results are not as accurate or precise, for the effect of the dip filtering operator on reflection component data amplitude. In certain instances, the processing steps in this sequence may be satisfactory as substitutes for the more detailed processing sequence. The data plot results obtained and displayed in FIG. 8 confirm, however, that processing according to the present invention provides significantly more meaningful data when compared to a conventional display such as that of FIG. 4. In fact, there is a substantial similarity between the portions noted of interest at 50, 52 and 54 in FIG. 7 and corresponding areas of FIG. 8. The display of FIG. 8 serves to confirm the benefits of processing according to the present invention.

While the present invention has been described in specific steps, it is contemplated that those skilled in the art may substitute comparable steps, additions or modifications without departing from the scope of the present invention which is limited only by the appended claims.

I claim:

1. A method of processing seismic data to remove the effect of amplitude aliasing from displays of the data, comprising the steps of:
   (a) obtaining field records of seismic data;
   (b) assembling the seismic data into common geometry gathers;
   (c) determining an amplitude aliasing corrective factor for unwanted repetitive dispersions in the data;
   (d) applying the corrective factor to the assembled data to equalize signal amplitudes in the assembled data;
   (e) transforming the equalized signal amplitudes in the assembled data to a different domain after said step of applying the corrective factor;
   (f) enhancing the reflection signal content of the transformed data;
   (g) inverse transforming the enhanced signal content data from the different domain;
   (h) applying an inverse of the corrective factor to the inverse transformed data; and
   (i) forming a display of the data after said step of applying an inverse of the corrective factor so that the effect of amplitude aliasing is removed from the data.

2. The method of claim 1, wherein said step of enhancing the reflection signal content of the transformed data comprises the step of:
   applying a multi-dimensional filter to the transformed data.

3. The method of claim 2, wherein said step of applying a multi-dimensional filter comprises the step of:
   applying a two-dimensional filter to the transformed data.

4. The method of claim 2, wherein said step of applying a multi-dimensional filter comprises the step of:
   applying a three-dimensional filter to the transformed data.

5. The method of claim 1, wherein said step of obtaining field records comprises the step of:
   obtaining field records of seismic data in a time-offset domain.

6. The method of claim 1, wherein said step of assembling the seismic data into common geometry gathers comprises the step of:
   assembling the seismic data into common source gathers.

7. The method of claim 1, wherein said step of assembling the seismic data into common geometry gathers comprises the step of:
   assembling the seismic data into common receiver gathers.

8. The method of claim 1, wherein said step of assembling the seismic data into common geometry gathers comprises the step of:
   assembling the seismic data into common midpoint gathers.

9. The method of claim 1, wherein said step of assembling the seismic data into common geometry gathers comprises the step of:
   assembling the seismic data into common offset gathers.

10. The method of claim 1, wherein said step of transforming the assembled data comprises the step of:
    transforming the assembled data to a frequency-wavenumber domain.

11. The method of claim 1, wherein said step of determining a corrective factor comprises the steps of:
    (a) determining the trace envelope of the seismic energy in the field records obtained from the seismic receivers; and
    (b) obtaining a ratio of the amplitude of the seismic energy to the trace envelope of the seismic energy in the field records obtained from the seismic receivers.

12. The method of claim 1, further including the step of:
    determining an inverse of the corrective factor prior to applying it to the inverse transformed data.

13. The method of claim 12, wherein said step of determining an inverse of the corrective factor comprises the step of:
    (a) determining the trace envelope of the seismic energy in the field records obtained from the seismic receivers; and
    (b) applying the trace envelope to the enhanced signal content reflection strength to restore the amplitude of the seismic energy indicative of subsurface structure.

14. A method of processing seismic data to remove unwanted amplitude variations from meaningful reflection signal components of interest concerning subsurface formations, comprising the steps of:
  (a) obtaining field records of the seismic energy detected at a number of seismic receivers in an area of interest;
  (b) determining a trace envelope for the seismic energy in the field records obtained from the seismic receivers;
  (c) obtaining a ratio of the seismic energy to the trace envelope for the seismic energy in the field records obtained from the seismic receivers to thereby equalize the amplitude in the trace data;
  (d) transforming the equalized amplitude trace data to a different domain after said step of obtaining a ratio;
  (e) enhancing the reflection signal component of the equalized amplitude trace data;
  (f) inverse transforming the enhanced reflection signal component data from the different domain;
  (g) applying the trace envelope to the enhanced signal component data to restore the amplitude of the seismic energy indicative of subsurface structure; and
  (h) forming a display of the restored amplitude seismic energy indicative of subsurface structure.

15. A method of processing seismic data to remove unwanted noise from meaningful reflection signal components of interest concerning subsurface formations, comprising the steps of:
  (a) obtaining field records in an original time-offset domain of the seismic energy containing both meaningful reflection signal components of interest and unwanted noise detected at a number of seismic receivers in an area of interest;
  (b) determining a trace envelope of the seismic energy in the field records obtained from the seismic receivers;
  (c) obtaining the inverse of the trace envelope for use as a corrective factor;
  (d) applying the inverse trace envelope corrective factor to the seismic energy in the field records obtained from the seismic receivers, thereby equalizing the amplitudes in the trace data;
  (e) transforming the equalized amplitude trace data from the original domain to a different data domain after said step of equalizing the amplitudes;
  (f) enhancing the reflection signal component of the equalized amplitude trace data in the different data domain to remove unwanted noise from the data;
  (g) inverse transforming the enhanced reflection signal component data to the original domain from the different data domain;
  (h) applying an inverse of the corrective factor to the enhanced reflection signal component data to restore the amplitude of the seismic energy indicative of subsurface structure; and
  (i) forming a display of the restored amplitude seismic energy indicative of subsurface structure.

* * * * *